Figure 1:
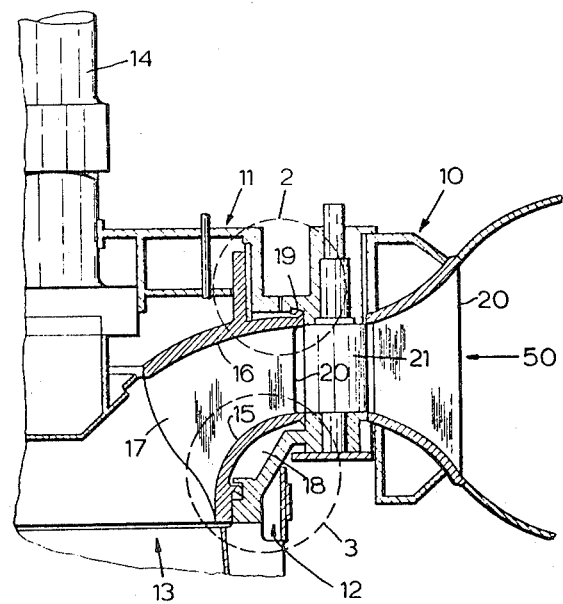

United States Patent  [15] 3,635,582
Sproule  [45] Jan. 18, 1972

[54] SEALS FOR HYDRAULIC MACHINES

[72] Inventor: Robert Stanley Sproule, Montreal, Quebec, Canada

[73] Assignee: Dominion Engineering Works, Limited, Lachine, Quebec, Canada

[22] Filed: Mar. 16, 1970

[21] Appl. No.: 19,769

[30] Foreign Application Priority Data

Mar. 19, 1969 Canada..................................46,107

[52] U.S. Cl..........................................415/170, 415/110
[51] Int. Cl........................................................F04d 29/08
[58] Field of Search................415/109, 110, 111, 112, 116, 415/170, 170 A, 171, 175, 176; 277/13–14

[56] References Cited

UNITED STATES PATENTS

| | | |
|---|---|---|
| 3,279,378 | 10/1966 | Sproule..................................415/110 |
| 3,253,816 | 5/1966 | Sproule..................................415/169 |
| 2,416,268 | 2/1947 | Nagler..................................415/171 |

FOREIGN PATENTS OR APPLICATIONS 972,907  10/1964  Great Britain..........................277/13

Primary Examiner—Henry F. Raduazo
Attorney—Raymond A. Eckersley, Frank L. Neuhauser, Oscar B. Waddell and Joseph B. Forman

[57] ABSTRACT

A pump, turbine or pump turbine having a runner with a crown and a band shroud is provided with annular cartridge seals which may be released from the machine housing, to permit disassembly of the machine even though the seals are seized to the runner. The seals each include an air separator and seal water provision, to permit efficient operation of the machine as an aerated machine having air admitted so as to exclude water from the annular zones external of an adjacent to the runner shroud outer surfaces.

10 Claims, 3 Drawing Figures

INVENTOR.
ROBERT S. SPROULE

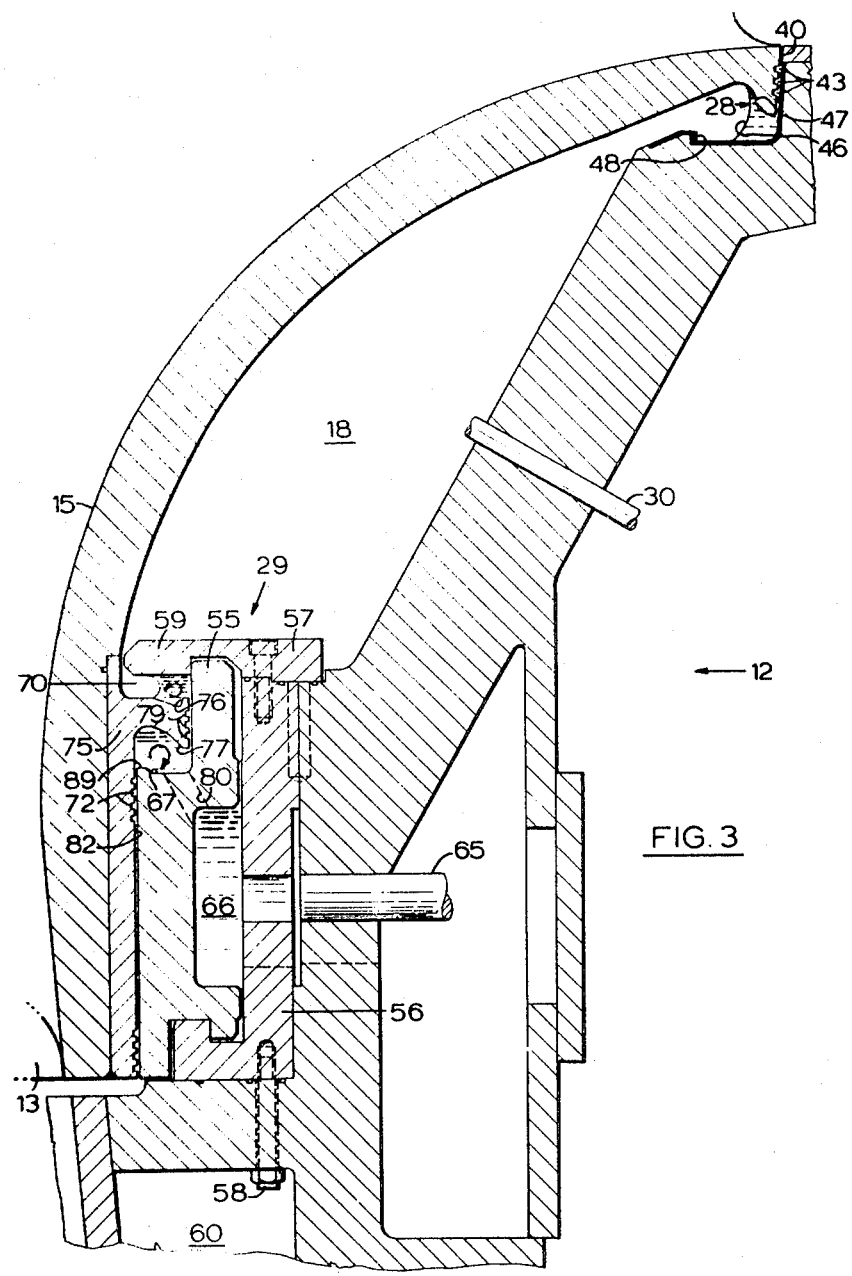

3,635,582

SEALS FOR HYDRAULIC MACHINES

This invention is directed to sealing provision for a turbomachine and in particular to seals for use in turbines pumps and pump turbines having shrouded runners and shroud space aeration.

In the operation of liquid handling turbomachines much effort has been devoted to increasing operational efficiency by reducing parasitic drag to a minimum.

In the case of machines having shrouded runners of the centrifugal pump or Francis turbine-type the aeration of shroud spaces adjacent the runner crown and band has been found to improve operating efficiency to a measurable extent. Owing to the high-capital cost involved in large machines, including the cost of providing compressed air, the practical implementing of such aeration schemes depends upon effective sealing of the aeration space or spaces, so that additional plant and operating costs to provide aeration do not absorb the potential economic gain.

In addition to providing effective aeration sealing, earlier arrangements have been made to provide removable seals to permit ready disassembly of a runner from the stationary casing in the event that the machine seals become seized to the band or crown.

The present invention provides a particularly advantageous combination of the functional characteristics of certain previous arrangements, while providing particularly simplified structure for improved operational reliability.

The present invention thus provides an aeration seal combination for use with pumps, turbines and pump turbines, having a resilient removable seal in the aeration space at the end remote from the runner high-pressure edge, the shroud having a flinger ring particularly shaped to promote toroidal flow of sealing liquid with consequent separation of air from the liquid to provide a stabilized air/liquid interface. The keep or cap structure of the withdrawable seal serves the dual function of defining the seal space in which the flinger ring is located, while the seal liquid, generally water, is first supplied to a pressure gallery of the resilient seal to hold the segments of the seal in radially inward sealing relation with the shroud, and passes in distributed relation to the seal space by way of a large number of small holes connecting the radially outer gallery with a radially inner face of the resilient seal.

The shroud is provided with a generally cylindrical portion in outward facing relation with the resilient seal having a limited radial clearance therefrom to form a sealant leakage path, the surface of the shroud being grooved to provide a plurality of radially extending energizing surfaces to promote toroidal motion of sealing liquid flowing along the leakage path, with consequent centrifuging separation of air from the leakage liquid, and to provide flow discontinuities.

At the shroud high-pressure edges the annular radially outer shroud edge surface and the facing annular surface of the stationary housing tapers inwardly towards the aeration space, relative to the runner main axis, and is provided with annular grooves, to promote separation and retention of air, to diminish leakage of air from the aeration space.

The surface of the shroud within the aeration space adjacent the high-pressure edge extends axially therefrom and tapers outwardly relative to the runner main axis to provide a liquid energizing surface for promoting toroidal liquid flow and the establishment of a stable gas/liquid interface with minimal removal of gas by entrainment in the liquid.

Figure 2:
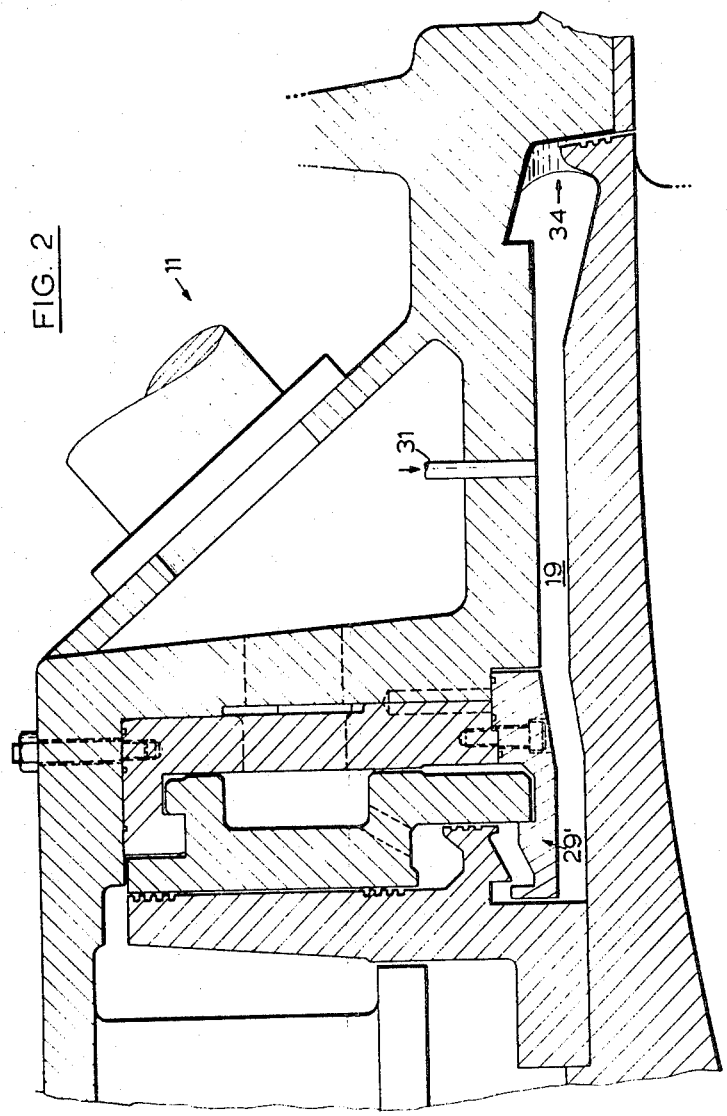

Certain embodiments of the present invention are described, reference being had to the accompanying drawings wherein, FIG. 1 is a half-sectional view of a portion of a shrouded machine of the type described for incorporating the subject invention; and FIG. 2 shows an enlarged portion of FIG. 1 and the incorporated subject seals.

FIG. 3 shows an enlarged portion of FIG. 1 encircled as 3.

Referring first to FIG. 1, which shows a portion of a Francis turbine, the assembled turbine 10 comprises stationary structure including a head cover 11 and lower housing 12, having runner 13 mounted therein suspended by shaft 14 for rotation in the casing.

The runner 13 has a band or skirt shroud 15, and crown or head shroud 16, with blades 17 extending therebetween. The shrouds 15, 16 define skirt shroud space 18 and head shroud space 19 with the adjacent stationary structure. The high-pressure edges 20 of the blades 17 lie adjacent wicket gates 21.

Referring to the seal details illustrated in FIG. 3 which are illustrated as if in the operative condition the skirt shroud space 18 is aerated from air supply 30, being bounded at its outer end by a lip seal 28, and at its inner end by a separator seal 29.

In the crown the crown shroud space 19 is aerated from air supply 31, being bounded at its outer end by a lip seal 34, and at its inner end by a separator seal 29''. The respective lip seals are similar, and the separator seals are also similar, so that for purposes of simplification the elements related to the band or skirt shroud 15 only will be detailed.

Dealing first with the lip seal 28, the annular high pressure edge 40 of the shroud 15 extends generally axially of the machine and is inclined inwardly towards the aeration space 18, relative to the runner main axis, the facing edge of the adjacent casing being correspondingly inclined. The annular outer surface 40 of the shroud lip is grooved at 43 to provide a leakage path of nonuniform section. The radially extending walls of the grooves serve to energize working liquid, in this case water, to promote toroidal flow in the grooves 43. This tends to produce centrifugal separation of air and water, with the air migrating radially inwardly in the direction of the machine axis and to the inner surface of the grooves. The escape of air upwardly through the lip clearance to the main flow 50 is impeded by the inclination of the lip surface 40 which serves to entrap air within the grooves 43.

The air/water interface 46 is established and energized by the inner inclined surface 47 of the shroud lip which provides local circulation to promote air centrifuging and a stabilized air/water interface. The lip 48 serves to localize the flow of seal water in the vicinity of the shroud edge.

Turning to the separator seal 29 which bounds aeration space 18 at the end remote from the high-pressure edge 40, the assembly comprises a resilient seal having a plurality of seal segments 55 mounted in an annular cage 56 and having an annular cap or keep member 57 to complete the seal mount. The seal cage 56 is secured by studs 58 which may be released from annular access chamber 60 adjacent the draft tube of the machine to provide for axial upward withdrawal of the runner 13 together with the seal 29.

Resiliency of the seal 29 is provided by a radial clearance between the surfaces of cage 56 and adjoining contact surfaces of the seal segment 55.

A plurality of seal water supply pipes 65 connect with an annular gallery 66, serving to hold the segments 55 in a radially inward sealing position towards the shroud 15.

A seal separation chamber 70 is formed between a nose portion 59 of the keep 57 and a shoulder 67 of the seal segment 55. A flinger ring 75 extends from the shroud 15 into separation chamber 70, being illustrated as having axially extending lip portions 76, 77 to promote local liquid circulation in the respective portions of chamber 70. The annular edge portion of the ring 75 is provided with grooves 79 to promote sealing and air retention.

A large number of circumferentially spaced small diameter bores 80 connect the gallery 66 with the chamber 70 for the supply of sealant liquid thereto.

The sealant liquid flow path to the draft tube from the chamber 70 is bounded by a plurality of grooves 72 extending for an axial portion of the shroud 15, to provide improved air separation. The radial clearance within the resilient seal 29 between the segments 55 and the cage 56 exceeds the radial clearance between the shroud 15 and the surface 82 of segment 55 which constitutes the sealant flow path, so that damage to the seal active surfaces is precluded by the resiliency of the stationary seal segments 55. Thus any transient runout of the runner during operation can generally be accommodated without affecting the long term effectiveness of the seal, and with substantially no damaging abrasion of running surfaces.

In operation the supply of sealing water to the pipes 65 is controlled at a rate whereby the pressure drop between the draft tube and the chamber 70 establishes a stable air/water interface as indicated. This also provides effective centrifugal separation of gas and liquid in the chamber 70 inner portion containing the interface. A radially and axially inner nose or lip 89 on the shoulder 67 of seal segment 55 serves to promote local toroidal circulation in the axially outer portion of chamber 70.

Due to the relative arrangement of the seal components, the occurrence of a "bump" during runout of the runner, which produces displacement of the edges of some segments 55 from sealing contact with the supporting shoulder surfaces of cage 56 and keep 57, also permits an increased quantity of sealing water to enter the chamber 70 by passage around the segment 55. This serves to flood-up the seal 29 to a limited extent and so maintain the air within the shroud space 18.

I claim:

1. A turbomachine selected from the group comprising turbines, pumps and pump-turbines having a shrouded runner rotatably mounted in a stationary casing structure with annular passage means for movement of working liquid therethrough; the runner having a crown shroud and a band shroud each having a high-pressure edge adjacent the casing annular passage means, and blades extending between the shrouds; a crown shroud space and a band shroud space each located between the stationary casing structure and an annular outer surface portion of the respective shroud remote from the blades, at least one of said shrouds space having fluid seals bounding an aeration space for confining compressed air admitted to the space to displace working liquid therefrom, one said seals having spaced annular shoulder portions extending from the stationary casing structure inwardly towards the runner main axis to define an annular seal space adjacent the respective said shroud, an annular flinger ring extending outwardly from the shroud within the seal space in radial overlapping relation with the shoulder portions, a plurality of segmented seal portions forming an annulus axially secured by one said stationary shoulder portions, said one shoulder being in segmented portions, removably secured to the stationary casing structure and comprising means to permit axial positioning of the flinger ring relative to the seal space and to permit withdrawal of said seal segmental portions, and liquid supply means to pass sealing liquid to the seal space.

2. The turbomachine as claimed in claim 1 wherein said flinger ring is spaced in axial facing relation with said removable shoulder portion to form a separation chamber, said ring having an annular lip extending axially into the separation chamber to provide a liquid circulation energizing surface to promote toroidal liquid flow and centrifugal separation of liquid and air in the chamber.

3. The turbomachine as claimed in claim 1, wherein said annular segmented seal portions form a radially inwardly extending shoulder portion to define in part the other said annular stationary shoulder portion, an annular seal water gallery recessed in an outer surface of said segmented seal means, and a plurality of spaced small apertures extending through the seal segments connecting the gallery with said seal space to provide passage for sealing liquid therethrough.

4. The turbomachine as claimed in claim 3 wherein said annular seal segmented portions being resilient and have sufficient peripheral and radial clearances with the supporting portions of said stationary casing to permit a resilient sealing relation with said shroud whereby radial displacement of the runner from its axis provides corresponding displacement of the adjacent seal portion, within the limits of the radial clearance.

5. The turbomachine as claimed in claim 1, wherein said flinger ring has a radially outer axially extending annular edge portion in close running relation with a surrounding peripheral surface formed of said segmented seal portions said axially extending annular edge portion having a plurality of annular grooves to define a labyrinth seal with said segmented seal portions.

6. The turbomachine as claimed in claim 1 wherein a portion of said shroud on the side of said flinger ring remote from said aeration space has a cylindrical surface in close running relation with a facing portion of said stationary casing structure, and a plurality of annular recesses therein providing leakage path flow chambers of enlarged cross section to assist in air/liquid separation.

7. The turbomachine as claimed in claim 1 wherein at least one said shroud is provided with an aeration seal adjacent the respective said shroud high-pressure edge, wherein a restricted leakage path extends between an annular portion of the stationary structure and an annular axially extending radially outer face portion of the shroud arranged in radially facing relation therewith, said leakage path extending axially in radially inwardly tapering relation towards the respective said shroud space, whereby the passage of air in reverse flow relation away from the aeration space is diminished.

8. The turbomachine as claimed in claim 7 wherein said annular face portion of said shroud is provided with a plurality of annular recesses to form local enlargements of said leakage path wherein toroidal fluid flow and separation of entrained air is promoted.

9. The turbomachine as claimed in claim 8 wherein an annular portion of said shroud within said shroud space located adjacent said shroud edge portion is provided with a radially outwardly tapering surface in flow energizing relation with seal liquid to promote toroidal flow and separation of air from said sealing liquid.

10. The turbomachine as claimed in claim 9 wherein a portion of said stationary structure within said aeration space and adjacent said high-pressure seal includes an annular shoulder extending axially towards the respective said shroud to deflect sealing liquid away from the aeration space to flow in air sealing relation substantially in the confines of said high-pressure seal.

* * * * *